Jan. 12, 1943.   W. S. REYNOLDS   2,307,957
GAUGING MACHINE
Filed July 11, 1940   7 Sheets-Sheet 1

Fig. 1

INVENTOR
WARREN S. REYNOLDS
BY
ATTORNEYS

Fig. 2

Jan. 12, 1943. W. S. REYNOLDS 2,307,957
GAUGING MACHINE
Filed July 11, 1940 7 Sheets-Sheet 3

Fig.3

INVENTOR
WARREN S. REYNOLDS
BY
ATTORNEYS

Fig. 4

Jan. 12, 1943.   W. S. REYNOLDS   2,307,957
GAUGING MACHINE
Filed July 11, 1940   7 Sheets-Sheet 5

INVENTOR
WARREN S. REYNOLDS
BY
ATTORNEYS

Fig. 8

Jan. 12, 1943.    W. S. REYNOLDS    2,307,957
GAUGING MACHINE
Filed July 11, 1940    7 Sheets-Sheet 7

INVENTOR
WARREN S. REYNOLDS
BY
D. Verner Smythe
ATTORNEYS

Patented Jan. 12, 1943

2,307,957

UNITED STATES PATENT OFFICE 2,307,957

GAUGING MACHINE

Warren S. Reynolds, Stratford, Conn., assignor to Remington Arms Company, Inc., a corporation of Delaware Application July 11, 1940, Serial No. 344,960

10 Claims. (Cl. 209—88)

This invention relates to gauging apparatus, and particularly to gauging machinery adapted to automatically inspect and selectively segregate cartridges, and other articles.

Aims and objectives leading to the present invention were the provision of: a machine capable of accurately and safely gauging large quantities of cartridges or other product; simple mechanism for automatically delivering product to the gauging mechanism; mechanism for automatically ejecting satisfactory cartridges, at one point or one location and automatically ejecting unsatisfactory cartridges at another location; apparatus which will keep the product which is being tested within view of the operator at all times; gauging apparatus which is comparatively open and readily accessible for adjustment and repairs at all times; mechanism for automatically stopping the machine if the cartridge or other product should by any chance travel beyond the usual unloading stations.

Features resulting from the attainment of these objectives include an improved machine and apparatus which is: simple and positive in its operation; adapted to accurately check or gauge cartridges or other product at one station and to eject the inspected product at another station while a succeeding piece of product is being gauged, thereby insuring high output from the machine; adapted to transmit product from station to station in a substantially horizontal plane so that there is no danger of the same improperly falling from the machine by gravity; capable of selectively ejecting product at a plurality of stations (good product at one station and unsatisfactory product at another station); controlled by a simple trip mechanism; positively stopped by a simple switch structure actuated by product which happens to be carried beyond the usual unloading stations; operated by a simple main driving mechanism, including only one main drive shaft with a considerable number of secondary (gauging, feeding, ejecting, etc.) mechanism directly associated therewith.

Before describing the present improvement and mode of operation thereof in detail is should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring now in detail to the drawings which show the present preferred embodiment of the invention, and one industrial application thereof, there is provided a main frame 10 having front, back and side walls 11, 12, 13 and 14, respectively, with an integral or a connected top plate 15. This main frame may be placed upon or secured to a bench; or, may be provided with legs to support the same relative to a floor, any of these expedients being well known.

Work carrier

Above and near the center of the top plate 15 there is provided a work carrier 16, in the form of a cup-shaped turret having a plurality of holders 17, preferably in the form of separate bushings, adapted to serve as work gauging and holding members. These bushings are accurately and positively held as by a force fit in suitable bores 19 and set screws 18. The work carrier is secured to a vertical shaft 20 as by a spline connection 21 (see Fig. 2) with the shaft sturdily supported in any suitable and well-known form of bushing or bearing within a downwardly extending boss 22 on the underside of the top plate so that the work carrier is maintained against vertical, eccentric and wobbling movement, yet free for uniform rotation. The work carrier 16 is preferably provided with a plurality of flat surfaces 23, adjacent bores 19 and spaced an equal extent from the center of the carrier, which serve as stops to locate and limit movement of the holders 17 inwardly relatively to the carrier.

Rotating and indexing mechanism

As shown in Figs. 1, 2, 3 and 4, the work carrier shaft 20 extends downwardly below the boss 22 and has securely affixed thereto a drive and indexing plate 24, as by a nut 25 against the underside of the index plate forcing the latter securely against a shoulder 26 portion of the shaft 20. This index plate is provided with a plurality of drive slots 27 and index notches 28, equal in number to the holders 17 in the work carrier.

Figure 1:
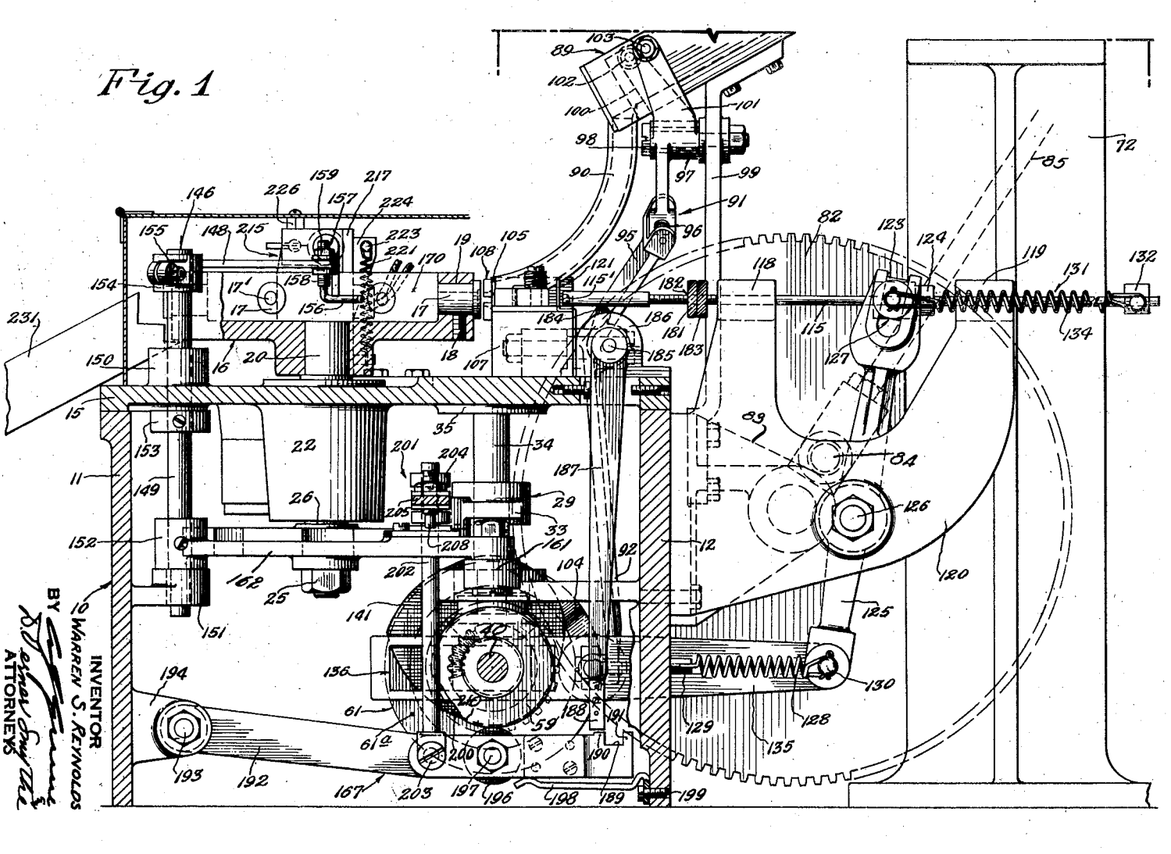
Figure 1 is a sectional view through the center of the machine taken on line 1—1 of Fig. 2.

Rotation of the index plate 24 and interconnected work carrier 16 is preferably effected by a Geneva mechanism 29 including a roller 30 secured as by a shoulder stud 31 and nut 32 to the outer end of an arm 33 which in turn is suitably secured to a vertically supported shaft 34, in bearings 35 and 36 respectively in the top plate 15 and standard 37, the latter being preferably integral with the rear wall 12 and projecting inwardly of the base (see Fig. 1). Any suitable bearing support for the shaft 34 which will support it for rotation and against vertical displacement, and well within the skill of the ordinary mechanic, may be used for this purpose. The shaft 34 is rotated as by a bevel gear 38 secured to the end thereof engaging a cooperating bevel gear 39 on a main drive shaft 40. As the arm 33 is rotated the roller 30 thereon is moved into succeeding slots 27 in the index plate and serves to move the latter arcuately a predetermined extent each time the arm 33 and shaft 34 is given one complete rotation and allows the index plate and associated work carrier to dwell in the index position a predetermined time. For example, the index plate remains stationary from the time the roller leaves the slot 27 in the position shown in Fig. 2 and travels in a counterclockwise direction until it enters the suceeding slot 27, as shown in solid lines in Fig. 7.

Indexing is very closely related to the rotation of the index plate 24 and work carrier 16, and is accomplished, according to the present invention, by the provision of a swing arm 41, pivotally secured to the underside of the top plate 15 as by a stud 42, with a U-shaped lug 43 adapted to enter successive notches 28 in the index plate between the slots 27. Preferably a spring 44 connected to the wall 11 and to a stud 45 on the arm 41 is provided to yieldingly urge the lug 43 successively into the notches 28. An indexing cam plate 46 is secured to the shaft 34 as by a screw 47 and has a lobe 48 adapted to engage with a roller 49 at the outer end of the swing arm 41 to force the latter with the lug 43 entirely clear of the index plate 24 and to allow the lug to ride into successive notches properly at intervals in the operation of the machine. The location and proportions of the arm 41 and index cam 46 with respect to related parts in the machine is such that the cam 46 moves the swing arm and lug in a counterclockwise (Figs. 4 and 7) direction and free of the index plate while the roller 30 is arcuately moving the index plate. As the indexing movement is completed, the lobe or high portion 48 of cam 46 passes away from roller 49 on arm 41 and the arm and its lug 43 are thereupon restored to locking position, lug 43 occupying the notch 28 adjacent the one from which it was displaced to permit indexing movement.

Main driving mechanism

Figure 2:
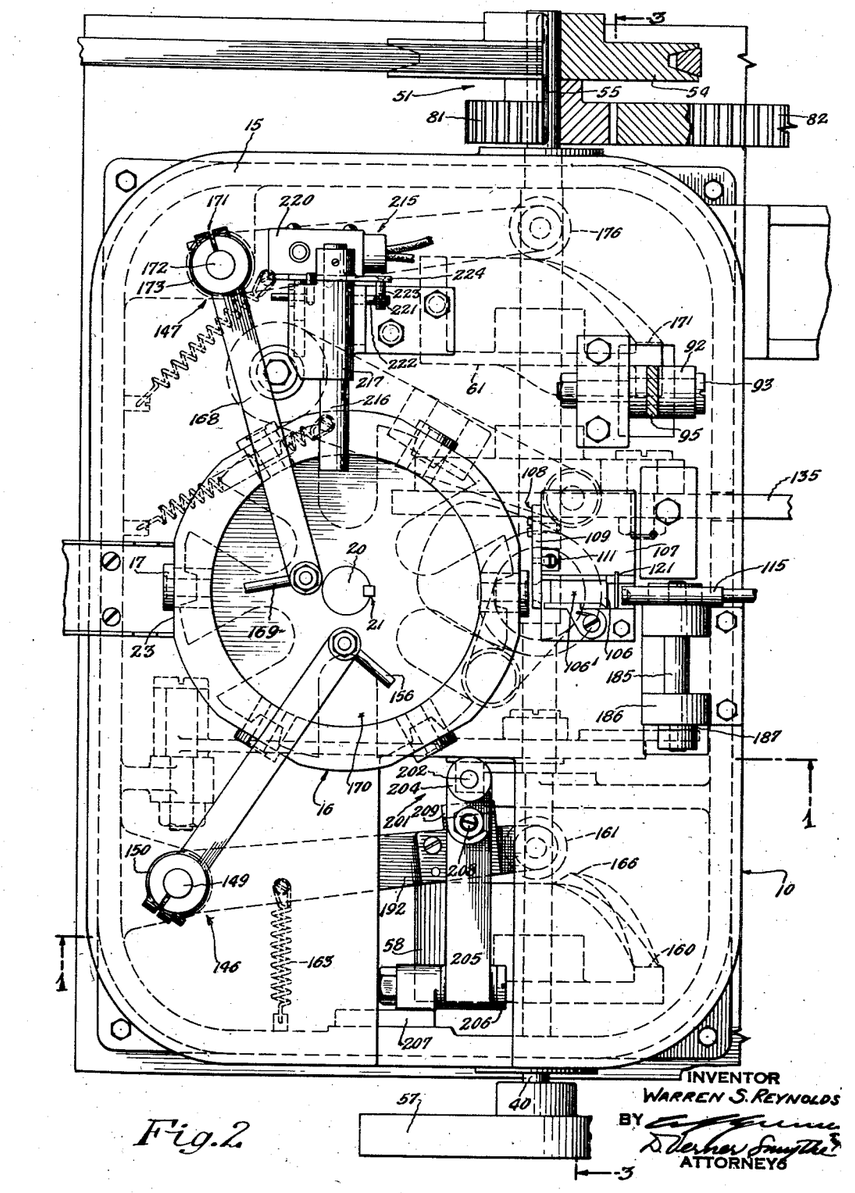
Fig. 2 is a top plan view of the automatic gauging apparatus.
Figure 3:
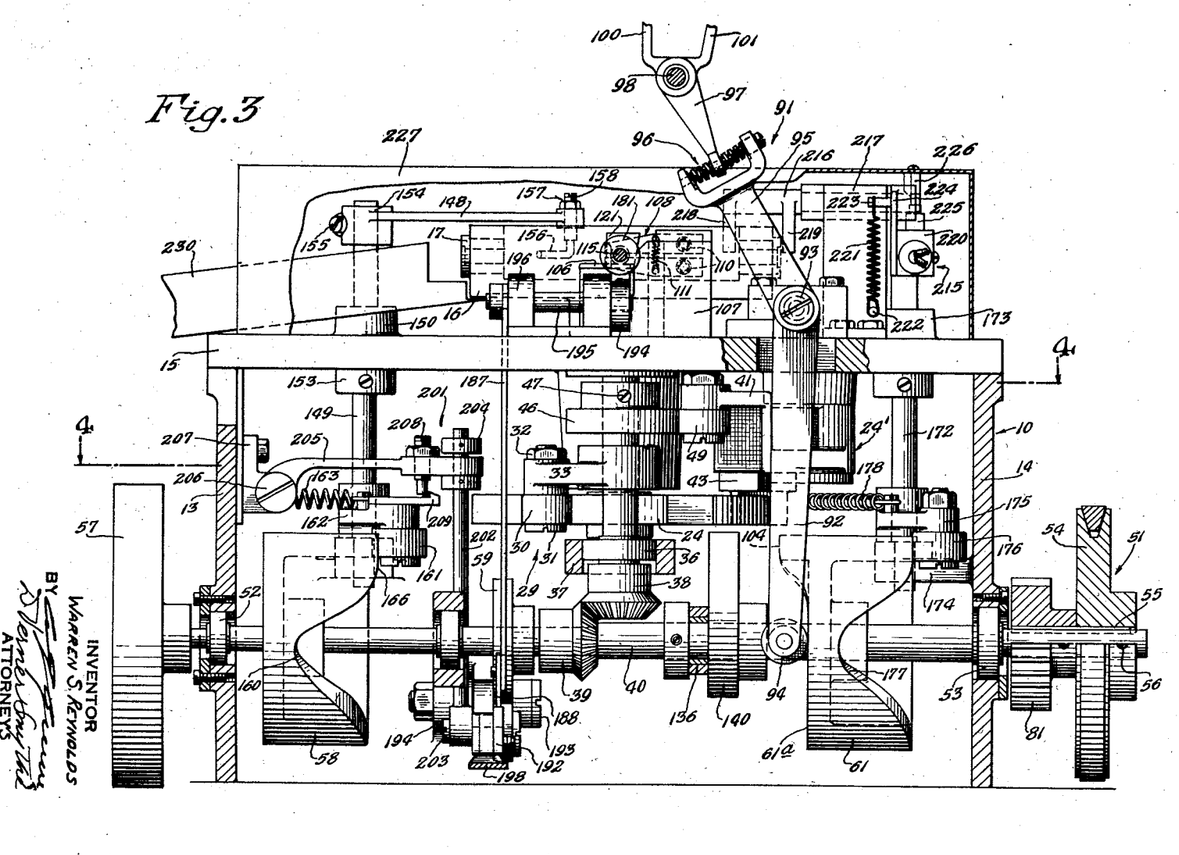
Fig. 3 is a longitudinal cross-sectional view taken on line 3—3 of Fig. 2.
Figure 4:
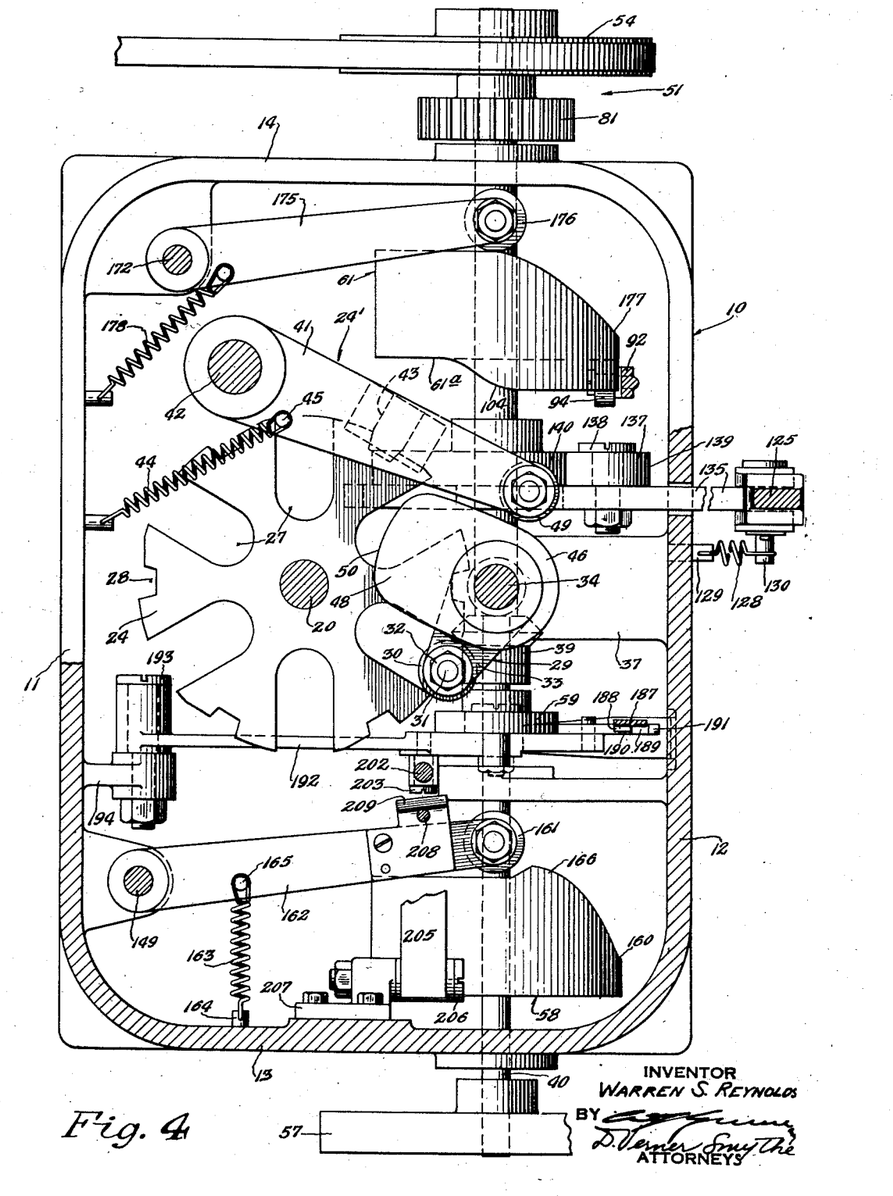
Fig. 4 is a sectional view taken on line 4—4 in Fig. 3.

The main driving mechanism 51, best seen in Figs. 1, 2 and 3, includes a main drive shaft 40 extending longitudinally across the machine and preferably suitably supported for rotation in any conventional bearings 52 and 53 in side walls 13 and 14 of the main frame. A drive pulley 54 is secured to one end of the shaft 40 as by spline 55 and set screw 56, and a flywheel 57 is preferably secured to the other end of the main drive shaft. Within the main frame walls 13 and 14, as viewed in Fig. 3, and suitably secured thereto, the main drive shaft 40 carries an ejector cam 58, a trip mechanism cam 59, a plunger cam 140, and a combined selector and ejector cam 61, all of which will be described in greater detail hereinafter. Any suitable prime mover may be used to rotate the main drive shaft.

Hopper feed mechanism

A hopper feed mechanism 70 (Figs. 8 and 9) is provided to insure a continuous supply of product to the machine. In its present preferred form this hopper feed includes a container 71 suitably mounted upon and secured to a standard 72 (Fig. 1). An arcuately movable agitator 73, including segmental plates 74 suitably spaced from each other, is carried by a hub 75 on a shaft 76 and is adapted to be vertically or arcuately reciprocated within the container 71.

Figure 8:
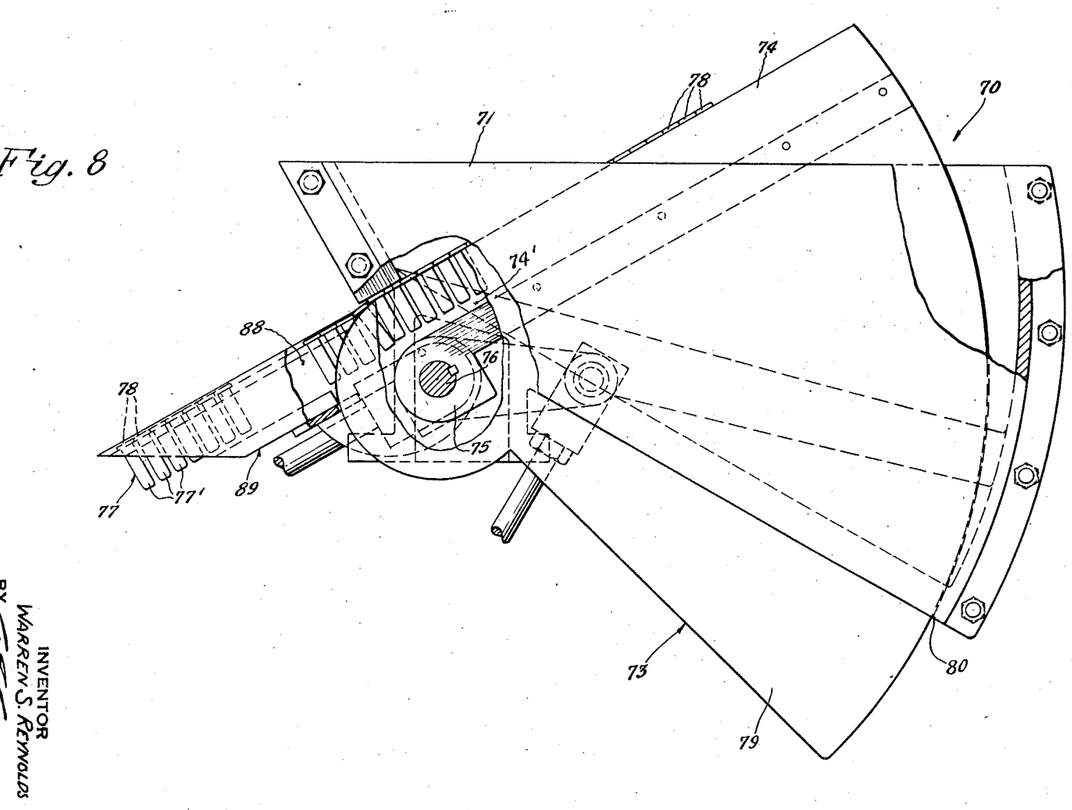
Fig. 8 is a side view of the work feeding mechanism.
Figure 9:
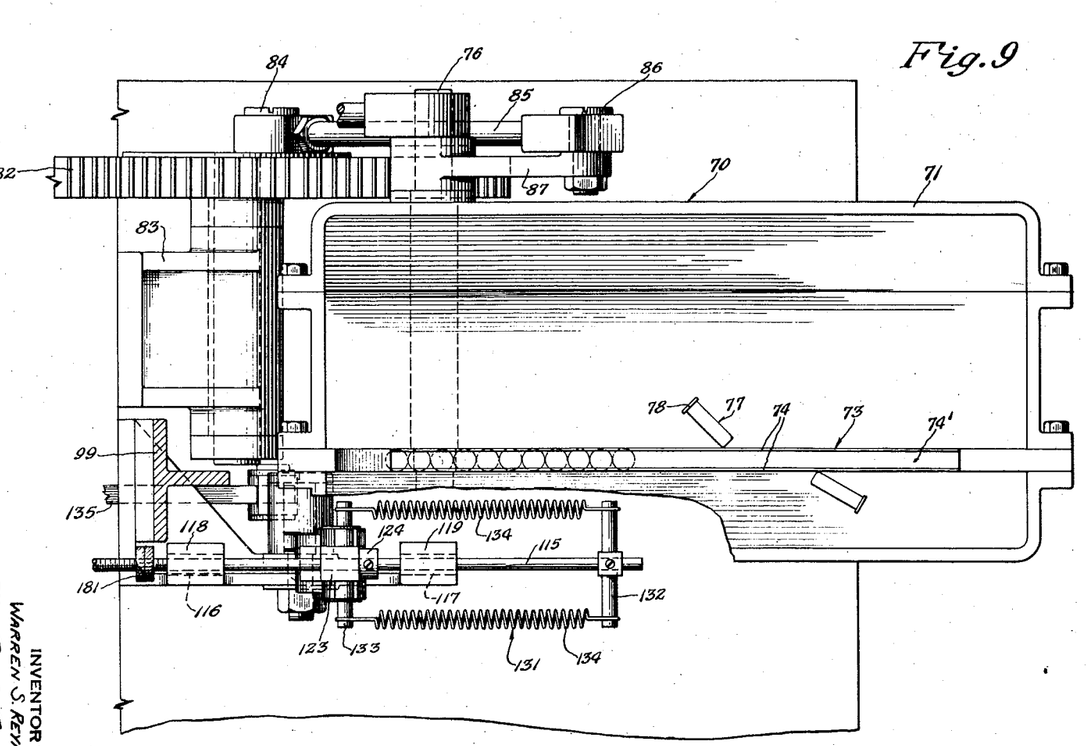
Fig. 9 is a top plan view of the work feeding mechanism shown in Fig. 8.

Cartridges 77, or other shouldered or flanged product, may be dropped into the container 71; and, as the agitator 73 is arcuately moved it picks up this product with the flanges 78 thereon serving to suspend the product upon the spaced plates 74, as may be seen best in Figs. 8 and 9. A lower solid segment 79 thereon serves to close an opening 80 at the bottom of the container 71. Arcuate reciprocation of the agitator 73 is effected by a gear 81 at an end of the main drive shaft 40 (see Fig. 2) meshing with and driving an intermediate gear 82 suitably and rotatably mounted upon a rearwardly extending bracket 83 (see Figs. 1 and 9 particularly) which has an eccentrically located stud 84, at one side thereof pivotally associated with a connecting rod 85 connected at its upper end through a stud 86 to a rearwardly projected arm 87 secured to the shaft 76 which is connected to the agitator 73.

Thus, as the main drive shaft 40 rotates, the eccentrically located stud 84 with the connecting rod 85 and arm 87 arcuately reciprocates the agitator 73 through the collection of cartridges or other flanged products which are in the container 71 to maintain a "run" of the same between the plates 74 which serve as slide members for the product.

Figures 5, 6, 7:
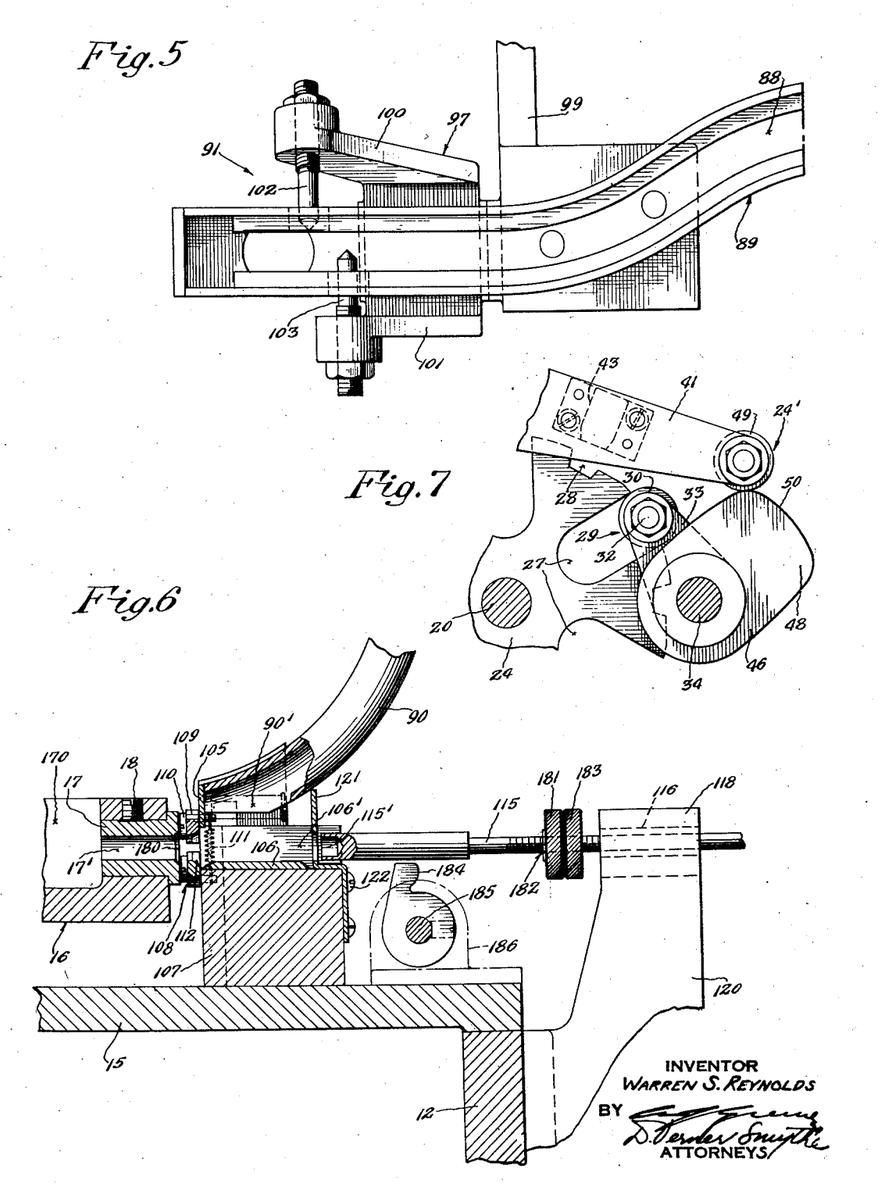
Fig. 5 is an enlarged detail of the selective mechanism.
Fig. 6 is a fragmentary sectional view of the work loading and gauging mechanism.
Fig. 7 is a fragmentary view of the feeding and indexing mechanism at the start of its cycle of operation.

When the agitator 73 is in the raised position shown in Fig. 8 it causes successive pieces of product to ride from a channel 74' between and upon the plates 74 on the agitator 73 to a channel 88 of a stationary member 89, and thence to drop downwardly through a suitable duct 90 which is secured to the top of the main frame 10, as may be seen best in Figs. 1 and 6. This duct is preferably slightly curved so that the product travels by gravity directly into a horizontal position adjacent the holders 17 on the work carrier 16, as may be seen best in Figs. 1, 2 and 6.

Selective feed mechanism

In order to insure a controlled or a one-by-one feed of product coordinately with the indexing of the holders 17 and the work carrier 16, the present invention provides a selector mechanism 91 (Figs. 1, 3 and 5) including a lever 92, pivotally mounted upon a stud 93, having a roller 94 at the lower end thereof adapted to engage with a face 61a on a cam 61 secured to the main drive shaft 40, as may be seen best in Fig. 3. This lever 92 has an upstanding arm 95 with a yielding connection 96 to a selector arm 97 pivotally mounted upon a stud 98 which is suitably secured to an upstanding bracket 99. The selector arm 97 is provided with a pair of fingers 100 and 101 extending upwardly on opposite sides of the fixed member 89 and having small stop pins 102 and 103, respectively. The long flat face of the cam 61 serves to maintain the stop pin 102 in the path of the entire run of product until the indexing mechanism brings a holder 17 in the work carrier 16 into registry with the bore of a work receiver adjacent the end of duct 90, whereupon a lobe 104 on the cam 61 engages the roller 94 and moves the lever 92 in a clockwise direction, as viewed in Fig. 3. By this movement the stop pin 102 is retracted from the path of the lowermost article in channel 88 simultaneously with the passage of the secondary stop pin 103 into the path of the next succeeding article (Fig. 5), whereby only one article will fall into the duct 90. The secondary stop pin 103 prevents the passage of any more than one, and serves to check the supply in the channels 88 and 74' until the stop pin 102 is passed into the channel 88 of the stationary member 89 again, whereupon the secondary pin 103 is retracted and allows a next succeeding article to pass into engagement with the main stop pin 102 until such a time as the latter is again retracted.

*Power work feed and gauge mechanism*

The cartridges 77 or other product, as they drop downwardly through the duct 90, are successively stopped by a plate 105 transverse the duct 90 at the lower end thereof (see Figs. 1 and 6 particularly) whereupon they drop downwardly through a suitable opening 90' at the bottom of the duct into a U-shaped guide member 106 at the top of a block 107 above the top plate 15. A gate 108 consisting of a pair of fingers 109 mounted upon studs 110 with a connecting coil spring 111 serves to prevent the product from working or moving forwardly in the guide member 106, so that there is no danger of the same passing into the path of the work holders 17 or carrier 16 excepting when forced in that direction at the proper time. The pair of fingers 109 of the gate are opened, against the tension of the spring, whenever the product is forced forwardly against bevelled walls 112 thereon.

In order to force the successive pieces of product from the U-shaped guide member 106 the present invention provides a plunger 115 mounted for longitudinal movement in suitable bushings 116 and 117, as may be seen best in Figs. 1, 6 and 9, in fingers 118 and 119 of a bracket 120 integral with or secured to the rear wall 12 of the main frame. The forward or innermost end of the plunger may be additionally supported in a suitable bore of a bearing plate 121 secured to the block 107, as by screws 122.

Normally the plunger 115 is yieldingly urged into an inoperative position, clear of the work carrier and to the right as shown in Figs. 1, 6 and 9, by a block 123 which is freely slidable upon the plunger 115 being urged rearwardly or to the right as viewed in Figs. 1, 6 and 9 against a collar 124 secured to the plunger, as by a lever 125 pivotally mounted upon a stud 126 and having a slot connection 127 with the slide block 123 whenever the lever is urged in a clockwise direction about the pivot stud 126 as by a coil spring 128 suitably connected upon a stud 129 to the rear wall 12 of the main frame 10 and to a pin or stud 130 at the lower end of the lever. Fig. 1 particularly discloses this latter mechanism.

To yieldingly urge the plunger 115 forwardly, or to the left as viewed in Figs. 1, 6 and 9, the present invention provides spring connection 131 between a cross-plate 132 at the outermost end of the plunger 115 and suitable projecting studs 133 upon the slide block 123. Thus, whenever the lever 125 is moved in a counterclockwise direction, as viewed in Fig. 1, studs 133 on the slide block 123 through the coil springs 134 and cross-plate 132 pull the plunger 115 to the left through the bearing plate 121 to the channel 106' in the guide member 106 to push the cartridge 77, or other product, through the gate 108 and into the bore 17' of the work holder 17 which is indexed and located directly in the path thereof.

Power means are provided to move the lever 125 from the inoperative to the operative position just described, including a pusher arm 135 having any usual form of block and slot connection 136 to the main drive shaft 40 at one end and having a pivotal connection with the lower end of the lever 125 as by a stud 130, this arm in turn being provided with a roller 137 rotatably mounted upon a stud 138 in such a manner that the periphery 139 thereof engages with a cam 140 secured to the main drive shaft. Thus, as the main drive shaft is rotated a lobe 141 upon the cam 140 engages with the roller 137 and moves the pusher arm 135 to the right as viewed in Fig. 1, against the tension of the spring 128 to pull the plunger to the left as by the connection 127. The location of the cam 140 on the shaft 40 and the shape of the lobe 141 is such that they move the plunger to the operative position only after the work carrier 16 is fully moved into a succeeding station and held there by the lug 43 of indexing mechanism 24' previously described, and after a new piece of product is dropped into the guide member 106 by the selective feed mechanism 91. The plunger 115 also cooperates with a gauging mechanism in a manner shortly to be described.

*Dual ejecting mechanism*

The present invention provides a dual ejecting mechanism for selectively ejecting good product at one station and bad or unsatisfactory product at another station, the former being referred to herein as the primary ejecting means 146 and the latter as the secondary ejecting means 147.

The primary ejecting means 146 includes an arm 148 secured to a shaft 149 rotatably mounted in bearings 150 and 151 in the top 15 and front wall 11 respectively, said shaft being supported against a vertical movement therein by a collar 152 suitably secured at the lower end of the shaft and overlying the bearing 151 and against upward movement by a collar 153 secured to the upper end of the shaft 149 as by a screw below the bearing 150. The arm 148 may, as shown in Figs. 1, 2 and 3 particularly, be secured to the shaft 149 as by a collar 154 and screw 155. At its outer end the arm 148 is provided with an ejector finger 156 secured thereto by a screw and nut connection 157 in a position to be reciprocated into and out of bores 17' in work holders 17 at predetermined times and eject good product from the work holders 17 whenever the latter reach the position shown adjacent the finger 156 in Fig. 2. The connection 157 includes a threaded shank 158 on the finger 156 associated with a conventional threaded bore in the end of the arm 148 for both vertical and arcuate adjustment of the arm while the nut 159 serves to lock the finger in the desired position.

Arcuate movement of the primary ejecting mechanism, and particularly the finger 156 thereon, from the inoperative position shown in Fig. 2 into an operative position with the finger 156 projecting work completely from the bore 17', is effected by a drop lobe 160 on the cam 58 secured to the main drive shaft 40 allowing a roller 161 secured to the outer end of a lever 162 on the lower end of the shaft 149 to move to the left, as viewed in Fig. 3, or toward the side wall 13, under the influence of a spring 163 secured to the wall 13 and lever 162, as by studs 164 and 165. Retraction of the ejector finger 156 from the operative position to the inoperative position shown in Fig. 2 is accomplished by a rise lobe 166 on the cam 58 moving the roller 161 and lever 162 in a counterclockwise direction against the tension of the spring 163.

Trip mechanism 167 is provided to allow the primary ejecting mechanism to move to the ejecting or operative position only predetermined times, as when good product is carried by work holders 17 in the carrier 16 into a position adjacent the finger 126. This trip mechanism will shortly be described.

The secondary ejecting means 147 is somewhat like the primary ejecting means 146, and includes an upper arm 168, with an ejector finger 169 at the outer end thereof within the cavity 170 of the work carrier 16, adapted to move in a clockwise direction, as viewed in Fig. 2, from the inoperative position shown therein in solid lines, arcuately a slight extent until the finger 169 is moved through the bore 17' of successive work holders 17. This arm is suitably secured as by a connection 171 to the upper end of a shaft 172 supported in bearings 173 and 174 in the top and side walls 15 and 14, respectively, of the main frame 10 in very much the same manner as the shaft 149 of the primary ejecting mechanism. Also, similarly to the latter, it is provided with a lower arm 175 secured thereto in any suitable manner, with a roller 176 at the outer end thereof engaging a cam 61, as may be best seen particularly in Fig. 4. No trip mechanism is provided; accordingly, a drop lobe 177 on the cam 61 allows the roller 176 to be moved to the left as viewed in Fig. 3 once each time the main drive shaft 40 is rotated, and consequently once each time the bore 17' of a new work holder 17 is moved into the path of the ejecting finger 169.

Thus, the finger 169 of the secondary ejecting mechanism will eject any bad product which is not worked upon by the primary ejecting mechanism in a predetermined manner. Any suitable spring 178 may, as shown, or in any desired manner, be connected to the front wall 11 and thence to the lower arm 175 to yieldingly urge the roller 176 and arm 175 in a clockwise direction as viewed in Fig. 2, or to the left as viewed in Fig. 3.

*Gauging and tripping mechanism*

Gauging accomplished by the present mechanism includes a check or machine inspection of the diameter of a shank section 77', and/or of the diameter and length of the flange 78 on the product. Referring particularly to Fig. 6, the bore 17' of the work holder 17 is accurately formed to limit entrance or passage therein of cartridges 77 or other work which happens to be oversize. Normally product of this kind has a slight taper so that even oversize product may initially partly enter the work holder but if the shank or body thereof is oversize wedging or limiting of inward movement of product occurs, whereby it projects to the right or outwardly of the work holder, as viewed in Fig. 6. If the flange section 78 on the product is oversize it either will not fit into the bevel 180 provided therefor at the end of the work holder or will project outwardly from the face of the holder an undesirable extent. Somewhat similarly, if a flange is not formed on the product or is undersize it will allow product to enter into the bore of the holder 17 or enter the cavity of the carrier 16 too deeply.

A cooperating gauging member includes the plunger 115 when it is reciprocated to the left, as viewed in Fig. 6. During this leftward movement the plunger ejects product from the guide member 106 into the work holder 17, while the forward end 115' thereof engages a flanged end of the product.

Now, it is to be particularly noted that the plunger 115 is provided with an adjustable gauging member 181, having a suitable adjustable connection 182, such as a screw thread, on the plunger 115, which may be held in the desired position as by a secondary locking member 183. As the plunger is pulled to the left by the mechanism hereinbefore described, including a cam 140, pusher arm 135, lever 125 and spring connection 131, the gauging member 181 engages an upwardly projecting finger 184 secured to a horizontally disposed pivot stud 185 on a suitable bracket 186 at the top of the plate 15 and through the latter moves a long trip finger 187, also secured to the pivot stud 185, in a counterclockwise direction, as viewed in Fig. 1, until product in the work holder limits further pulling of the plunger 115 to the left, as viewed in Fig. 1. It should be particularly noted that slight movement of the short finger 184 causes a relatively great travel of the long finger 187 so that small differences in product are accurately checked.

Whenever the product is of the right size plunger movement, and particularly movement of the gauging member 181, is just enough to move a control end 188 of the long finger 187 to a position immediately above a notch 189 defined by shoulders 190 and 191 upon a control lever 192 pivotally mounted upon a stud 193 secured to a rearwardly projecting bracket 194 on the front wall of the machine. A roller 196 is mounted upon a stud 197 near the free end of the control lever 192, and is arranged to be urged against cam 59 by a flat spring 198 secured to the rear wall 12 as by a screw 199. A drop lobe 200 is provided on this cam which permits the roller 196 and associated control arm 192 to be moved upwardly within the main frame 10 whenever the control end 188 of the long finger 187 overlies the notch 189.

Associated with the trip mechanism the present invention provides a detent mechanism 201 to normally restrain the primary ejecting means from operating, including a lift rod 202 pivotally connected to the control lever 192 as by a stud 203, and having a pair of collars 204 at the upper end thereof for locating and controlling the outer or free end of a drop lever 205 pivotally secured upon a stud 206 to a bracket 207 at the side wall 13. This drop lever is provided with a downwardly projecting stud 208 adapted to drop into the path of a hook lever 209 which is secured to the swing arm 162 portion of the primary ejecting mechanism.

Operation of the trip mechanism is as follows: Whenever good product is located in a work holder 17 the gauging member 181 on the plunger locates the lower part of the long finger 187 centrally over the notch 189 whereupon the spring 198 raises the roller 196 and the control lever 192 upwardly when the drop or low lobe 200 is adjacent the roller, whereupon the rod 202 and collar 204 kick the drop lever 205 and stop pin 208 upwardly or counterclockwise, as viewed in Fig. 3, until the drop pin is clear of the hook 209 whereupon the roller 161 and swing arm 162 of the primary ejecting means 146 may be moved in a clockwise direction by the spring 163 when the drop lobe 160 is adjacent the roller 161 and thereby swing the ejecting finger 156 toward and into the bore of the adjacent holder 17 to eject good product therefrom.

Whenever the product is oversize in shank diameter, flange diameter or flange length the plunger 115 is prevented from moving the usual extent to the left, as viewed in Fig. 1, whereupon the control end 188 of the long finger 187 overlies the shoulder 190 instead of the notch 189, whereupon the roller 196 cannot be urged into the drop lobe 200 of the cam 59 by the spring 198 and the detent mechanism 201 cannot be released.

The same general condition occurs whenever the flange 78 is omitted or undersized, for then the plunger 115 and gauging member 181 moves the end 188 of the finger 187 an excessive amount in a counterclockwise direction, as viewed in Fig. 1, into a position overlying the shoulder 191. Thus, it will be seen that it is necessary for the product to be of the right size in order for the primary ejecting mechanism to be released. Timing of the tripping mechanism 167, or more particularly the relationship between the drop lobe 200 on the cam 59 and drop lobe 160 on the cam 58 of the primary ejector, is such that the latter is not made operative on good shells until a work holder 17 is moved from a station adjacent the plunger 115 into the next station adjacent the ejector finger 156, as will be readily appreciated. This has the advantage of making possible an ejecting of product at one station at the same time that gauging is occurring at another or starting station, and thereby insures a large output from the machine.

The rise or angular faces from the low lobes 160 and 200 back to the high lobes 166 and 210 on the cams 58 and 59 serve to recondition the trip mechanism 167 and detent mechanism 201 each time the main shaft is rotated once; or, each time the carrier is indexed one station. The long finger 187 is so proportioned and weighted that in merely hanging by gravity from the stud 185 it overlies the shoulder 190, as shown in Fig. 1, where it remains if the gauging member 181 does not push the control end over the notch 189. Also, it drops back to that position when the control lever is kicked down again by the rise lobe of cam 59 even though the end 188 is temporarily in the notch 189 or over the outermost shoulder 191. The timing or length of the high lobe 141 on the cam 140 for pulling the plunger 115 forward is enough to maintain the gauging member 181 and control end 188 relative to the notch or shoulders 189 and 191 until the low lobe 200 of the cam 59 overlies the roller 196 of the control arm 192 so that the latter and the detent mechanism will function if the notch 189 correctly underlies the control end 188.

In the event that the product, such as a cartridge 77, is undersize or oversize, along the lines pointed out hereinbefore, the trip and detent mechanisms 167 and 201, respectively, do not release the primary ejecting means 146 so that the undersize or oversize product remains in the work holder either inwardly or outwardly thereof an excessive extent while the work holder travels past the station adjacent the primary ejecting finger 156, which remains in the inoperative position, until it reaches another station adjacent the secondary ejecting means 147, shown best in Fig. 2. Since the secondary ejecting means works once each time the work carrier is indexed the ejecting finger 169 thereon serves to eject undersize or oversize product remaining in any work holder 17 reaching the position adjacent the finger 169 of the secondary ejector.

*Operation*

Operation of the machine is as follows: Product is placed in the container 71 of the hopper feed mechanism and the machine through drive pulley 54 is started and run with any suitable prime mover; the agitator 73 and selector mechanism drop product, one by one, to the guide member 106; the plunger 115 pushes product successively into holders 17 in the carrier 16, and at the same time the plunger, through the gauging member 181, trip mechanism 167 and detent mechanism 201, condition the primary ejector 146 to engage with and eject only good product from the work carrier at the next station after the first or loading station; and a secondary ejector 147 is operated to eject unsatisfactory product at a succeeding station.

*Safety switch*

If any product remains in the work holder beyond the primary and secondary ejecting stations there might be danger of jamming a new piece of product against the same when it is carried around again to the loading station adjacent the plunger 115. To prevent such an occurrence the present invention provides a safety switch 215 including a rod 216 pivotally mounted in a suitable bracket 217 at the right-hand side of the machine, as viewed in Fig. 1, said rod being provided with a pair of downwardly projecting fingers 218 and 219 at the inside and outside of the work carrier 16 which are tilted upwardly by any product moved thereto by the work carrier 16. The outer end of the rod 216 (right-hand end as viewed in Fig. 3) supports a conventional "Micro" switch 220 which is connected to a conventional circuit for a motor driving the main pulley 54, or to a relay for a clutch or any other control. A spring 221 connected to studs 222 and 223 on the bracket and arm 217 and 224, respectively, urge the fingers 218 and 219 into a down position and allow the same to be tilted upwardly and to tilt the "Micro" switch, and particularly a button 225 thereof, downwardly away from a depending lug 226 supported by a casing 227, thereby opening a conventional circuit to a motor, or otherwise conditioning the circuit to any other conventional electrical control apparatus, whenever product is moved by the carrier into the path of either or both of the fingers. Use thereof is optional but greatly increases the efficiency and advantages of the present machine.

A chute 230 outside the work carrier 16 and adjacent the primary ejecting mechanism, when the latter is in the operative position, and a chute 231 adjacent the secondary ejector are provided to respectively divert ejected good and unsatisfactory product to suitable locations and containers. These chutes may be of conventional construction suitably secured to the top of the main frame 10.

Variations and modifications may be made within the scope of this invention, and portions of the improvements may be used without others.

Having thus described the invention what is claimed as new is:

1. In a gauging apparatus the combination of a main frame; a work carrier; a plurality of work holders in said carrier; means for moving said carrier, and the holders therein, successively into loading and unloading stations; means carried by said frame for loading work into the holders at a loading station; means carried by said loading means for gauging work at the loading station; and means controlled by said work loading means for ejecting work at the unloading station.

2. In a gauging apparatus the combination of a main frame, a plurality of work holders, an indexible turret comprising a stationary guide member, means for intermittently placing pieces of work into the guide member, means for moving work from the guide member to the work holder, means carried by said work moving means for gauging the work, an ejector device for accepted work, means controlled by said gauging means for conditioning said ejector device for operation, and means for actuating said ejector device when conditioned for operation by said conditioning means to eject accepted work.

3. In a gauging apparatus the combination of a frame; a work holder; an ejector; operating means for the ejector, including a swing arm and a cam; a detent mechanism adapted to engage said arm for preventing the arm from cooperating fully with the cam; a trip mechanism adapted to actuate said detent mechanism for releasing said swing arm, including a lever with a notch defined by two shoulders; a plunger; gauging means on said plunger; and means actuated by said plunger to cooperate with said notch for controlling said trip mechanism.

4. In a work gauging and sorting machine, in combination, a dial, means for rotating said dial in step by step movement, a work holder in said dial, a work receiving station at which work to be gauged is inserted in said work holder, an ejection station at which accepted work is ejected from said holder, a second work receiving station at which defective work is ejected from said holder, an inspection station located between said second ejection station and said work receiving station, a bifurcated member at said inspection station for determining the presence of a work piece in said holder by engagement with an end portion thereof, and means controlled by said inspection station member for stopping the machine if a work piece is found in said holder.

5. In a work gauging and sorting machine, in combination, a dial, a work holder on said dial, means for delivering a work piece to said dial at a work receiving station, means for indexing said dial and work holder to and beyond a plurality of ejection stations, an inspection station between the last of said ejection stations and said loading station, an electrical device comprising a bifurcated member at said ejection station for determining the presence of a work piece in said holder by engagement with a portion thereof projecting from said work holder, and machine controlling means actuated by said electrical device.

6. In a gauging and assorting machine, in combination, a carrier, a work holder on said carrier, means for indexing said carrier and work holder from a loading station to an ejection station, means at said loading station for delivering a work piece to said work holder comprising a plunger, plunger actuating means enabling variations in the movement of said plunger proportional to variations in the dimensions of the work piece delivered to the work holder, an ejection device in said ejection station, means operated in timed relation to each indexing movement of said carrier for actuating said ejection device, and means whereby over-movement or under-movement of said work delivering plunger prevents the operation of said ejecting device.

7. In a gauging and assorting machine, in combination, a carrier, a work holder on said carrier, means for indexing said carrier and work holder from a loading station to an ejection station, means at said loading station for delivering a work piece to said work holder and concurrently inspecting said work piece comprising a plunger, plunger actuating means enabling variations in the movement of said plunger proportional to variations in the dimensions of the work piece delivered to the work holder, an ejection device in said ejection station, means operated in timed relation to each indexing movement of said carrier for actuating said ejection device, a latch for preventing the actuation of said ejection device by said actuating means, and a latch disabling mechanism controlled by said plunger.

8. In a gauging and assorting machine, in combination, a carrier, a work holder on said carrier, means for indexing said carrier and work holder from a loading station to an ejection, means at said loading station for delivering a work piece to said work holder and concurrently inspecting said work piece comprising a plunger, an ejection device in said ejection station, means for actuating said ejection device, a latch for preventing the actuation of said ejection device by said actuating means, latch disabling means comprising a lever normally reciprocated in each cycle of operation, and a device controlled by said plunger for preventing reciprocation of said lever.

9. In a gauging and assorting machine, in combination, a carrier, a work holder on said carrier, means for indexing said carrier and work holder from a loading station to an ejection station, means at said loading station for delivering a work piece to said work holder and concurrently inspecting said work piece comprising a plunger, an ejection device at said ejection station, means for actuating said ejection device, a latch for preventing the actuation of said ejection device by said actuating means, latch disabling means comprising a lever normally reciprocated in each cycle of operation, an abutment adapted to prevent such reciprocation of said lever, and means controlled by said plunger for shifting said abutment to permit reciprocation of said lever if the work piece in said work holder is acceptable.

10. In a gauging and assorting machine, in combination, a carrier, a work holder on said carrier, means for indexing said carrier and work holder from a loading station to an ejection station, means at said loading station for delivering a work piece to said work holder and concurrently inspecting said work piece comprising a plunger, an ejection device at said ejection station, means for actuating said ejection device, a latch for preventing the actuation of said ejection device by said actuating means, latch disabling means comprising a lever normally reciprocated in each cycle of operation, a shiftable abutment in the path of said lever, a notch in said lever adapted to receive said abutment, and means controlled by said plunger for shifting said abutment into alignment with said notch when the work piece in said work holder is acceptable.

WARREN S. REYNOLDS.

CERTIFICATE OF CORRECTION.

Patent No. 2,307,957. January 12, 1943.

WARREN S. REYNOLDS.

It is hereby certified that error appears in the printed specification of the above numbered patent requiring correction as follows: Page 1, second column, line 5, for "improvement" read --improvements--; line 6, for "is" read --it--; page 6, first column, line 11, before "a" second occurrence, insert --an indexible turret comprising--; lines 11-12, strike out "an indexible turret comprising"; second column, line 26, after the word "ejection" insert --station--; and that the said Letters Patent should be read with this correction therein that the same may conform to the record of the case in the Patent Office.

Signed and sealed this 27th day of April, A. D. 1943.

(Seal)

Henry Van Arsdale,
Acting Commissioner of Patents.